United States Patent
Kesner et al.

[11] Patent Number: 6,055,362
[45] Date of Patent: Apr. 25, 2000

[54] APPARATUS FOR PHASE SYNCHRONIZING CLOCK SIGNALS IN A FULLY REDUNDANT COMPUTER SYSTEM

[75] Inventors: Donald R. Kesner; David W. Selway, both of Phoenix; David A. Bowman, Glendale, all of Ariz.

[73] Assignee: Bull HN Information Systems Inc., Billerica, Mass.

[21] Appl. No.: 08/625,664

[22] Filed: Mar. 29, 1996

[51] Int. Cl.⁷ ............................. G06F 15/00; G06F 11/34
[52] U.S. Cl. ................................. 395/180; 331/2; 331/17; 368/46
[58] Field of Search ....................... 375/279, 374, 375/375, 376, 354; 395/180, 181, 182.01, 182.08, 182.09, 182.1; 455/180.3; 368/46, 48; 331/1, 2, 17, 25, 1 A, 40

[56] References Cited

U.S. PATENT DOCUMENTS

| | | | |
|---|---|---|---|
| 3,882,424 | 5/1975 | Debois et al. | 332/127 |
| 4,823,262 | 4/1989 | Calle | 395/553 |
| 5,301,171 | 4/1994 | Blow et al. | 368/46 |
| 5,355,090 | 10/1994 | Pajowski et al. | 327/292 |
| 5,422,915 | 6/1995 | Byers et al. | 375/357 |
| 5,446,416 | 8/1995 | Lin et al. | 331/11 |
| 5,530,726 | 6/1996 | Ohno | 327/149 |
| 5,552,726 | 9/1996 | Wichman et al. | 327/115 |
| 5,557,224 | 9/1996 | Wright et al. | 331/2 |
| 5,565,816 | 10/1996 | Coteus | 375/357 |
| 5,570,397 | 10/1996 | Kubista | 375/356 |

*Primary Examiner*—Albert Decady
*Attorney, Agent, or Firm*—J S Solakian; J H Phillips

[57] ABSTRACT

A redundant computer system including two systems capable of independent operation. The two systems correspondingly employ two independent clock generation and distribution (CGD) units which each issue clock and clock definer signals. The clock and definer signals of each system are used internally and are also sent to the other system. When the two systems are split, phase locked loops in each system are disabled, and each system is controlled by a precision oscillator in its own CGD unit When the two systems are merged, one CGD is designated as master and remains under control of its internal oscillator. The clock and definer signals of the master system are employed in the slave system to derive a signal which is used as the reference input to the slave system's phase locked loop from which the slave system's clock and definer signals are developed. Preferably, dual flip-flop phase detector type phase locked loops are employed. For higher frequency operation, it is desirable to incorporate certain correction circuitry which minimizes phase offset at apparent phase lock which is an inherent characteristic of this type of phase locked loop.

12 Claims, 6 Drawing Sheets

APPARATUS FOR PHASE SYNCHRONIZING CLOCK SIGNALS IN A FULLY REDUNDANT COMPUTER SYSTEM

FIELD OF THE INVENTION

This invention relates to the art of computer hardware and, more particularly, to insuring compatibility between two clock generating and distribution components during a merge of redundant computer systems.

BACKGROUND OF THE INVENTION

Some computer applications call for a high degree of system integrity, and various approaches have been taken to ensure that a system can continue to perform even in the event of failure of a key component. One such approach is to provide a fully redundant system in which each system component is duplicated, thus effecting two systems, each capable of operating independently, comprising the redundant system. There are distinct advantages to this approach including the fact that, in effect, the power of a tandem system is available for use during normal, failure-free operation. Further, if a component failure should take place, it may be, and usually is, possible to continue operation with a tolerable decrease in performance. The degree of adverse effect on overall system performance from such a failure depends, of course, on which component fails in a given case.

One source of problems which arises in implementing a fully redundant system is found in the necessity to integrate redundant clock generation and distribution (CGD) units into the redundant system. During normal operation, the redundant system operates under a rationalized clock basis. For example, one of the CGD units may operate in a "master" mode and source the clocks for both systems. If a component in one of the systems fails, the redundant system may be split such that the other system can continue operation under control of its own CGD unit while repairs are made to the failed system.

Once repairs have been made to the failed system, it may be tested operating under control of its own CGD unit. However, after its integrity has been confirmed, the two systems must be capable of being remerged on-the-fly. A similar condition exists on routine startup of the redundant system. Both of these related tasks may be complicated by such factors as instantaneous phase differences between the two clock sets, slight frequency differences between the two governing oscillators, slight differences in delays inherent in the physical and electrical displacements between the two CGD units, etc. It is to the solution of all these and other related problems that the present invention is directed.

OBJECTS OF THE INVENTION

It is therefore a broad object of this invention to provide improved clock generation and distribution units in a fully redundant computer system.

It is a more specific object of this invention to provide such improved clock generation and distribution units in which the difficulty of rationalizing differences between the outputs of the two clock generating and distribution units, during a merge of the two systems after a repair to one or during system startup or under other conditions in which the systems have been operating independently and must be merged, is overcome.

SUMMARY OF THE INVENTION

Briefly, these and other objects of the invention are achieved, in a redundant computer system made up of two computer systems each capable of independent operation, by employing two independent clock generation and distribution (CGD) units which each issue clock and clock definer signals. The clock and definer signals of each system are used internally and are also sent to the other system. When the two systems are split, phase locked loops in each system are disabled, and each system is controlled by a precision oscillator in its own CGD unit When the two systems are merged, one CGD is designated as master and remains under control of its internal oscillator. The clock and definer signals of the master system are employed in the slave system to derive a signal which is used as the reference input to the slave system's phase locked loop from which the slave system's clock and definer signals are developed. Preferably, dual flip-flop phase detector type phase locked loops are employed. For higher frequency operation, it is desirable to incorporate certain correction circuitry which minimizes phase offset at apparent phase lock which is an inherent characteristic of this type of phase locked loop.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
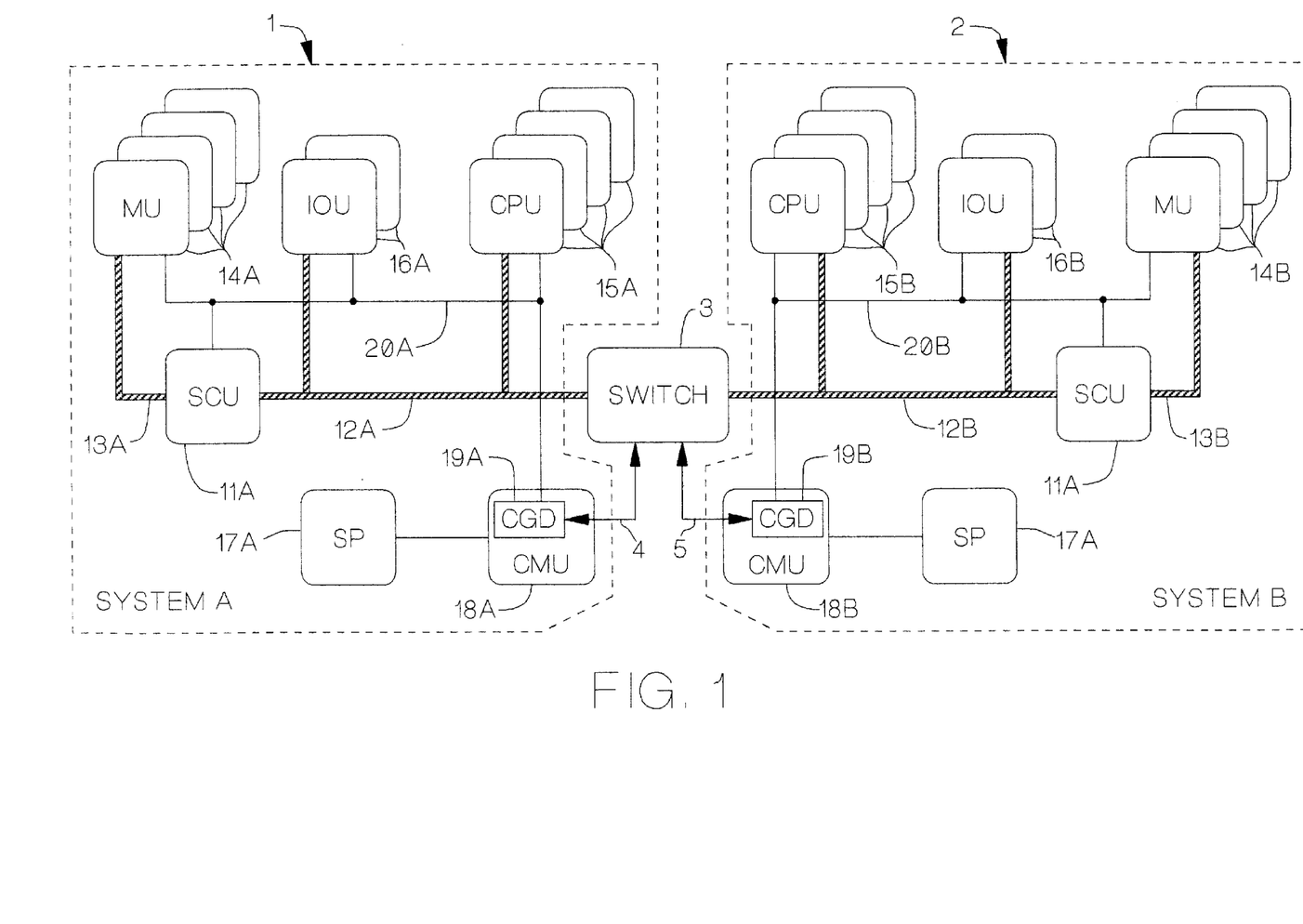
FIG. 1 is a high level block diagram of an exemplary fully redundant computer system effecting an environment in which the present application finds use.

Attention is first directed to FIG. 1 which illustrates an exemplary redundant computer system within which the subject invention may be incorporated and practiced. The redundant computer system may conveniently be separated into system A 1 and system B 2 with the addition of switch 3.

Referring specifically to system A 1, a System Control Unit (SCU) 11A centralizes and controls the scheduling of a system bus 12A and a memory bus 13A. More particularly, the SCU 11A: a) performs memory control including single bit error correction and double bit error detection; b) controls the memory configuration of which there are one per Memory Unit (MU) 14A; c) manages 64-byte block transfers between Central Processing Units (CPUs) 15A and the MUs in conjunction with a store-into-cache feature of the CPUs; d) corrects single bit errors found in modified blocks of a CPU's cache or on a data transfer from a CPU, MU or an input/output Unit (IOU) 16A; and e) contains the system calendar clock.

The system bus 12A interconnects one or more CPUs 15A and one or more IOUs 16A with each other and with the SCU 11A. In the exemplary environment, the system bus includes a 16-byte bi-directional data interface, a bi-directional address and command interface, an SCU status interface monitored by all CPUs and IOUs, and a small number of control lines between the SCU and each individual CPU and IOU. Data is exchanged on the system bus in 16, 32 or 64-byte groups, and data exchanges can be between a CPU and an MU, an IOU and an MU, first and second CPUs and a CPU and an IOU. The operations through the system bus 2A are: a) read: 16, 32 or 64 bytes; c) read with exclusivity: 64 bytes; d) write from IOU: 16, 32 or 64 bytes; e) write from CPU (swapping): 64 bytes; and f) interrupts and connects; -read/write registers.

Every system bus operation consists of an address phase and a data phase, and an address phase can start every two machine cycles. Consecutive 16-byte data transfers within a group can occur on consecutive machine cycles. An IOU 16A or a CPU 15B can wait for the data phase of up to two requests at the same time. The data blocks are transferred in the same order as the requests are received.

The memory bus 13A interconnects one or more MUs 14A with the SCU 11A. In the example, the memory bus includes a 16-byte bi-directional data interface, an address and command interface from the SCU to all MUs and a small number of control lines between the SCU and each individual MU. Data is exchanged on the memory bus in 16, 32 or 64-byte groups. The operations through the memory bus 3 are: a) read: 16, 32 or 64 bytes; and b) write: 16, 32 or 64 bytes.

The main memory of system A 1 is composed of one or more MUs 14. A single bit correction, double bit detection code is stored with every double word; i.e., eight code bits for every 72 data bits. The code is arranged so that a four-bit error within a single chip is corrected as four single bit errors in four different words. Data in an MU 14A is addressed from the SCU 11A in 16 byte (four word) increments. All bytes within any one MU are consecutively addressed; i.e., there is no interlace between MUs which operate in parallel. A memory cycle may start every machine cycle, and a memory cycle, as seen from a CPU 1SA, is ten machine cycles, assuming no conflicts with other units. An exemplary MU 14A contains 160 Dynamic Random Access Memory (DRAM) circuits (not shown), each of which has n by four bit storage elements where n=256, 1024 or 4096A.

The IOUs 16A each provide a connection between the system bus 2A and one or more I/O subsystems, not shown in FIG. 1.

A Clock and Maintenance Unit (CMU) 18A generates, distributes and tunes the clock signals for all the units in system A 1, provides the interface between a service processor (SP) 17A and the central processing, input/output and power subsystems, initializes the units of system A and processes errors detected within the various units in system A. Included within the CMU 18A is a clock generating and distribution (CGD) unit 19A which is a key element in the present invention and will be discussed in more detail below. Clock information is distributed from the CGD unit to the other units so system A 1 via clock bus 20A.

SP 17A may be a commodity personal computer with an integrated modem for facilitating remote maintenance and operations. (Large systems may include two SPs through which the system can be dynamically reconfigured for high availability.) The SP performs four major functions: a) monitors and controls system A 1 during initialization, error logging and diagnostic operations; b) serves as the primary operating system console during system A boot or on operator command; c) serves as console and data server for the input/output subsystems Maintenance Channel Adapter (not shown in FIG. 1); and d) provides a remote maintenance interface.

With respect to system B 2, units corresponding to those in system A 1 are denoted with a "B" suffix; i.e.: SCU 1 B, system bus 12B, memory bus 13B, MUs 14B, CPUs 15B, IOUs 16B, SP 17B, CMU 18B and CGD 19B. Thus, it will be understood that systems A 1 and B 2 effect a redundant computer system when integrated by certain coupling structure represented by switch 3 which couples the system busses 12A and 12B. In addition, CGD unit 19A and CGD unit 19B are coupled to one another via line sets 4, 5 and the switch 3 as will be described more fully below.

Figure 2:
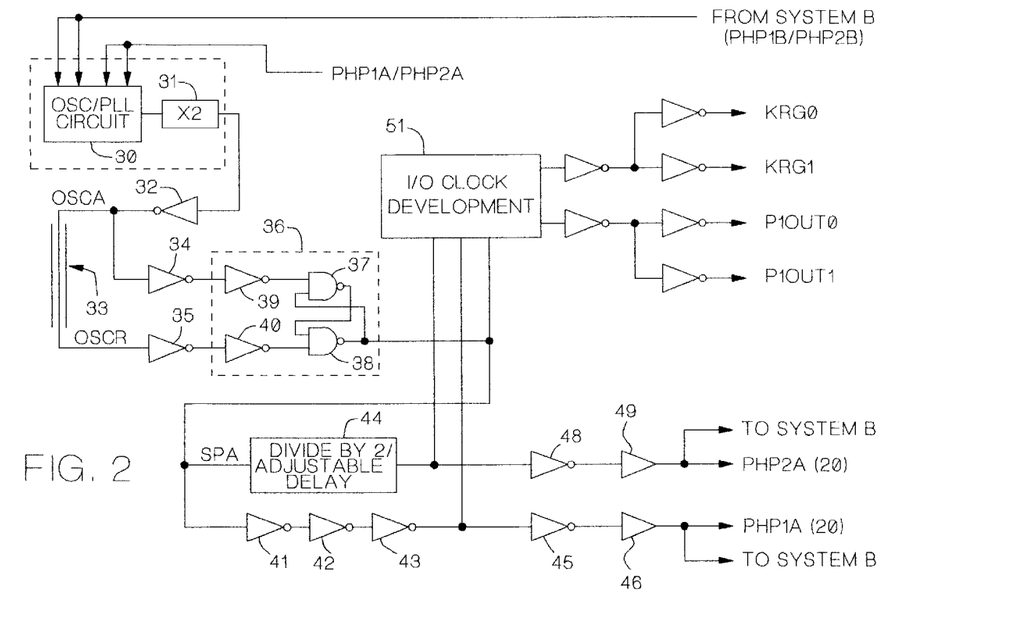
FIG. 2 is a simplified schematic diagram of a clock generation and distribution unit included in each system making up the redundant system.
Figure 3:
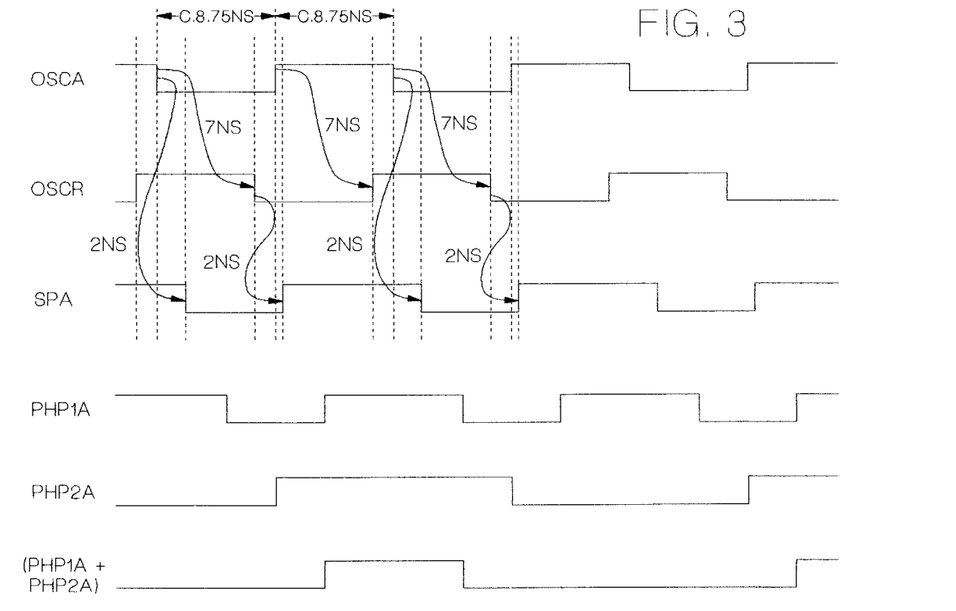
FIG. 3 is a waveform diagram illustrating the relationships among various signals of the logic circuitry illustrated in FIG. 2.

Attention is now directed to FIG. 2 which illustrates an exemplary CGD unit; e.g., CGD unit 19A. Reference may also be taken to FIG. 3 which shows waveforms of various signals in the CGD unit. The basic ting element for the CGD unit is an oscillator/phase locked loop circuit 30 which will be described in detail below. As will also be described below, oscillator/phase locked loop circuit 30 receives certain timing signals (PHP1A, PHP2A, PHP1B, PHP2B) which are used when, for example, system A is operating in a "slave" mode.

Oscillator/phase locked loop circuit 30 drives a frequency doubler circuit 31 which issues a signal at the system clock frequency, 57.14 MHZ. The system clock signal from the frequency doubler 31 drives a constant impedance buffer 32, the output of which is designated OSCA, and the waveform of which is included in FIG. 3. (From one perspective to be used later in this specification, the CGD proper may be considered all the circuitry in FIG. 2 "downstream" from the frequency doubler 31; i.e., the basic clock signal source may be either internal or external to the CGD.) OSCA is applied to the input of a delay line 33 which issues OSCR, a signal retarded from, but otherwise identical to, OSCA by seven nanoseconds in the example.

The signal OSCA is also applied to the input of an inverter 34, and the signal OSCR is applied to the input of another inverter 35. The inverters 34, 35 drive a waveshaper circuit 36 which includes a pair of cross-coupled NAND-gates 37, 38. Inverter 34 drives inverter 39 which, in turn, drives the second input to NAND-gate 37. Similarly, inverter 35 drives inverter 40 which, in turn, drives the second input to NAND-gate 38. The output signal SPA from the waveshaper circuit 36 is taken from the output of NAND-gate 38, and SPA is also shown in FIG. 3. There is an inherent delay of about two nanoseconds between the inputs to the inverters 34, 36 and the outputs of the NAND-gates 37, 38.

The temporal relationships among the signals OSCA, OSCR and SPA may best be understood from FIG. 3. At the exemplary system clock frequency of 57.14 MHZ, each cycle of OSCA is about 17.5 nanoseconds, and the full cycle period of OSCR is the same, but retarded by seven nanoseconds. Both OSCA and OSCR are nominally symmetrical; i.e., their "up" and "down" logic level periods are about equal, c.8.75 nanoseconds in the example. However, it will be observed that SPA is not symmetrical, and this is a result of the development in the waveform shaper 36 by which the trailing edge of SPA follows by about two nanoseconds (the nominal delay through the waveshaper 36 and the inverters 34, 35) the trailing edge of OSCA while the leading edge of SPA trails by about two nanoseconds the trailing edge of OSCR which, itself, trails the trailing edge of OSCA by the seven nanoseconds delay through delay line 33. Thus, the "down" time of SPA is about seven nanoseconds, and the "up" time of SPA is the remaining time in a system clock cycle as established by the oscillator/phase locked 11 loop circuit 30 and frequency doubler 31; i.e., about 10.5 nanoseconds in the example.

The signal SPA is applied to the input of three serially-connected inverters 41, 42, 43 through which a certain amount of delay is obtained The output from inverter 43 is designated PHP1A. The signal SPA is also applied to logic block 44 in which it is frequency divided by two to obtain signal PHP2A. In addition, the frequency division process renders PHP2A symmetrical, which characteristic is used to advantage as will be discussed more fully below. Logic block 44 also includes an adjustable delay by which the signal PHP2A may be precisely adjusted with respect to PHP1A during system setup in the manner well known in the art.

PHP1A is applied to the input of an inverter 45 which drives amplifier 46. Amplifier 46 thus issues PHP1A to several boards in system A (which carry the CPUs, SCU, IOUs, MUs) on the clock bus 20A as shown in FIG. 1. In the example, twenty copies of PHP1A are sent to other system components in system A 1. In addition, as previously noted, PHP1A is supplied to oscillator/phase locked loop circuit 30. Similarly, PHP2A, a symmetrical, half-frequency, time-displaced evolution of PHP1A, is applied to the input of an inverter 48 which drives amplifier 49. Amplifier 49 thus issues PHP2A to several boards in system A. In addition, PHP2A is sent to CGD unit 19B of system B 2 via switch logic block 3 as shown in FIG. 1. PHP2A is also supplied to oscillator/phase locked loop circuit 30.

Referring again also to FIG. 3, the relationship of PHP1A and PHP2A (as adjusted during system calibration) will be readily understood PHP1A, as previously noted, is asymmetrical (being a delayed replica of SPA), and it is the main system "logic clock". However, various events take place in the system on the leading or trailing edge of the logic "1" state of PHP1A and, in many instances, it is necessary to know which of two succeeding logic "1" PHP1A clock states should cause an event to occur; i.e., it is necessary to have available the equivalent of a two-phase clock. This is achieved by defining alternate logic "1" "phases" of PHP1A by the state of PHP2A. Thus, PHP2A is aligned to temporally "bracket" the PHP1A pulses such that a given PHP1A logic "1" pulse is defined as "phase 1" by a logic "1" PHP2A half cycle, and the next succeeding PHP1A logic "1" pulse is defined as "phase 2" by a logic "0" PHP2A half cycle. For this reason, PBP2A is referred to as a "definer".

Figure 4:
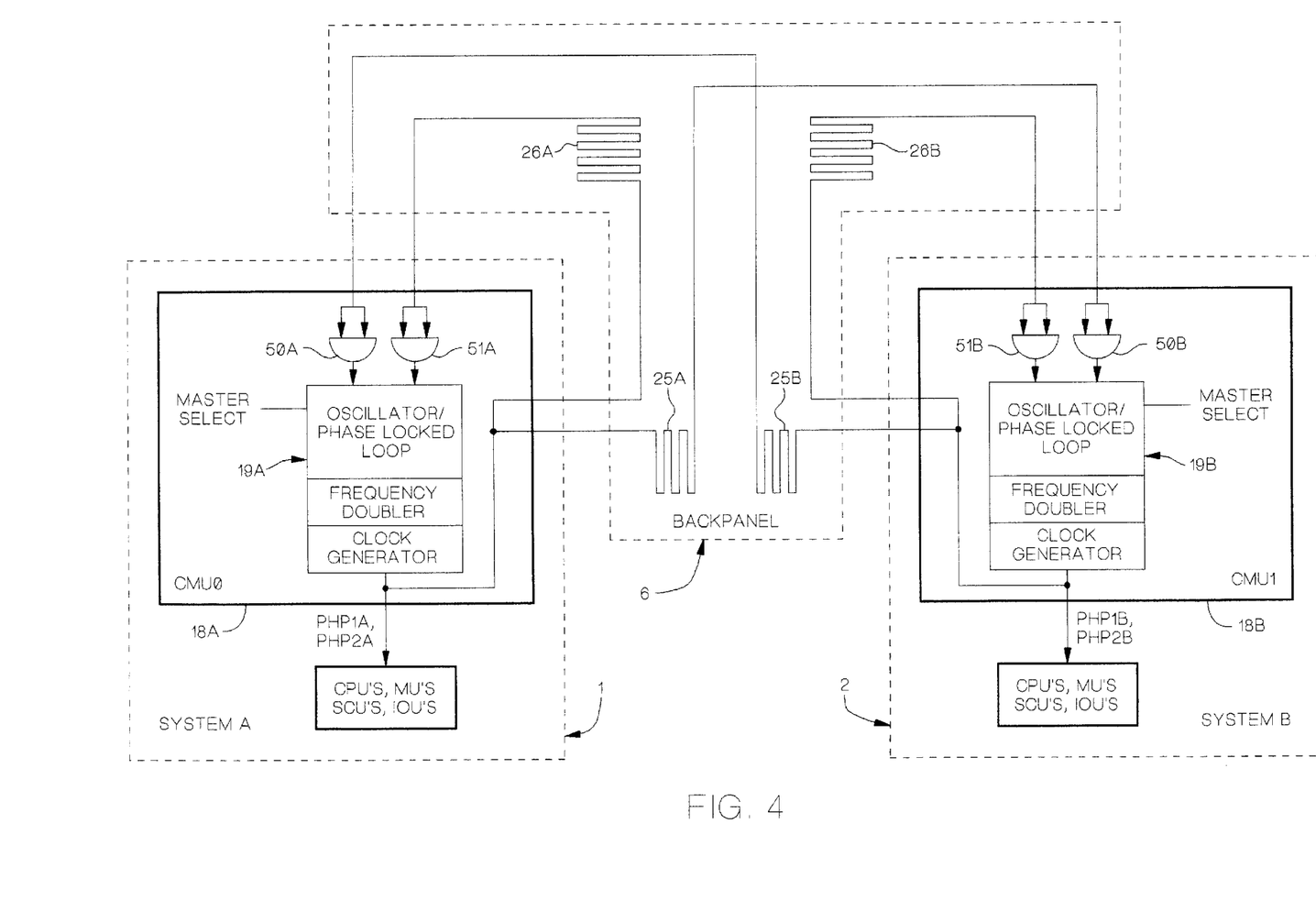
FIG. 4 is a high level block diagram illustrating the inter-relationship between the respective clock generation and distribution units in the two systems making up the redundant system.

Referring to FIG. 4, the relationship between the CMU0 18A of System A 1 and the corresponding CMU1 18B of system B 2 may be understood. For purposes of explanation, these two CMU units are considered to be substantially identical such that their descriptions may be partially combined.

Thus, CMU0 18A and CMU1 18A, 18B each include a CGD unit 19A, 19B, respectively, which has been previously described in conjunction with FIG. 3. More particularly, for example, the CGD unit 19A of system A sends PHP1A and PHP2A to an AND-gate 50B in CMU1 18B through a delay line pair 25A. In addition, the CGD unit 19A sends PHP1A and PHP2A to an AND-gate 51A through a delay line pair 26A. Similarly, the CGD unit 19B of system B sends PHP1B and PHP2B to an AND-gate SOA in CMU0 18A through a delay line pair 25B. The CGD unit 19B also sends PHP1B and PHP2B to an AND-gate 51*b* through a delay line pair 26B. The delay line pairs 25A, 26A, 25B, 26B, which may merely be suitably extended traces on the printed circuit (not shown) of a back panel 6, are employed to ensure that the instantaneous phases of the signals applied to the AND-gates 50A and 51B and those applied to the AND-gates 50B and 51A, respectively, are the same in both systems; i.e., propagation delays due to physical separation are directly compensated.

The oscillator/phase locked loop circuit, frequency doubler and clock generator components shown in the blocks representing the CGD units 19A, 19B each include the circuitry shown in FIG. 2. However, it may also be noted that there is provision (which may be internal or external) for designating either or both CGDs as a "master", and such is an important aspect of the invention.

Figure 5:
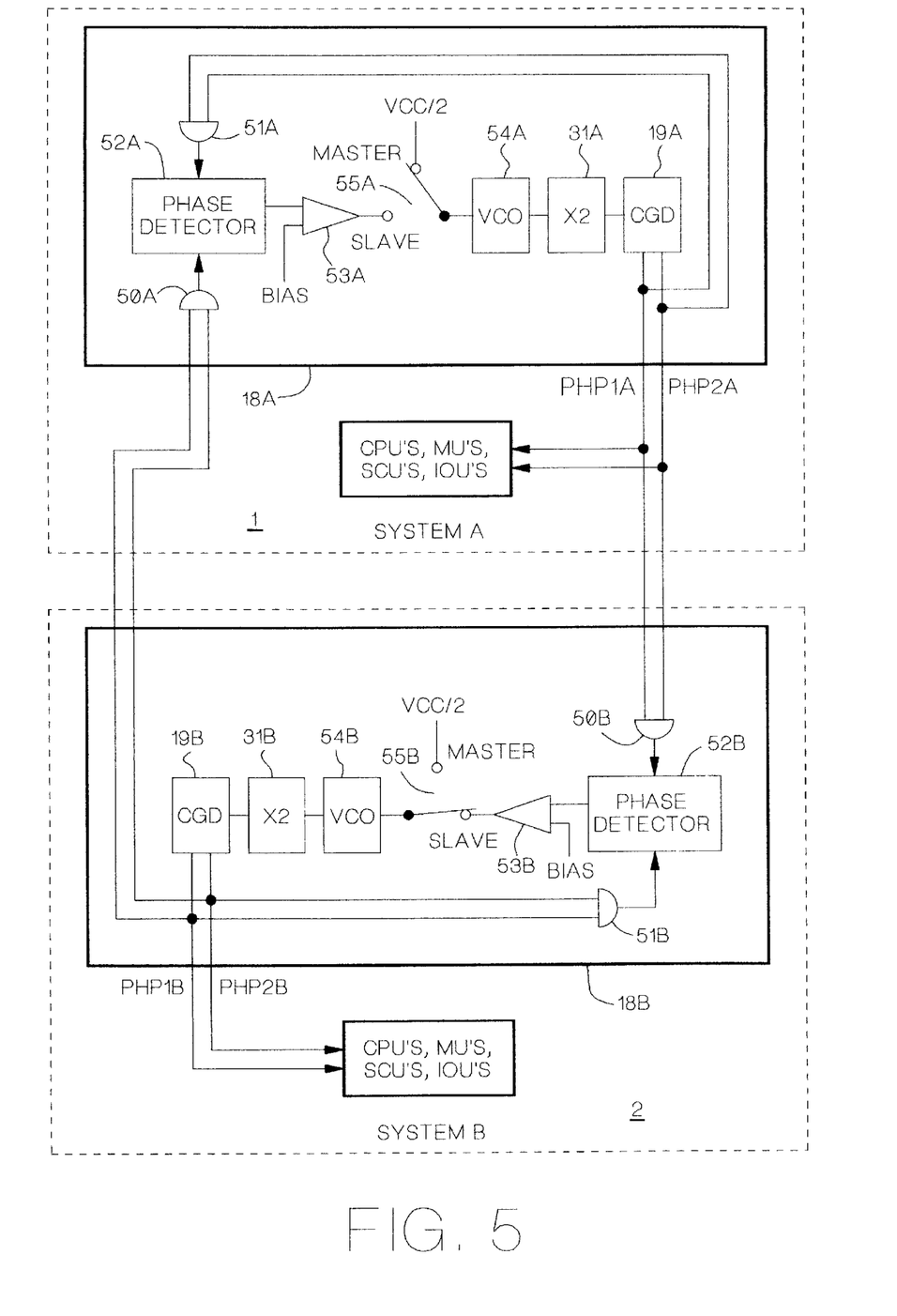
FIG. 5 is a detailed block diagram particularly illustrating a master/slave selector switch included in oscillator/phase locked loop circuits incorporated into each clock and generation and distribution unit.

Thus, attention is now directed to FIG. 5 from which the interrelationship between the CMUs 18A, 18B and the master/slave relationships which can be established between them will become clear. Those skilled in the phase locked loop art will recognize the classical components thereof in each of the CMUs 18A, 18B. Thus, a phase detector 52A, 52B compares the relative phase between two input signals from AND-gates 50A, 51A and 50B, 51B. A d-c signal from the phase detector, which is representative of the difference, if any, between the phases of the two input s signals, is applied to an amplifier 53A, 53B which issues a d-c output voltage having an amplitude dependent on the difference between the signal from the phase detector and a reference bias voltage. Ignoring for the moment (and assuming to be closed) master/slave switch 55A, 55B, the output of the amplifier 53A, 53B is applied to the control input of a voltage controlled oscillator (VCO) 54A, 54B whose frequency of oscillation depends on the input control voltage. In the classical phase locked loop, the output of the VCO 54A, 54B is used in some downstream circuitry and is also looped back to become one of the inputs to the phase detector 52A, 52B, the other input typically being at an external reference frequency. If the inputs are not in phase, suitable correction to the VCO takes place around the loop to bring the locally generated signal into phase lock with the reference input.

The foregoing phase locked loop operation will be explained in more detail in conjunction with FIG. 6; however, it is the purpose of FIG. 5 to show the changes from normal phase locked loop connections and the interconnections between the CMUs of the two systems by which the critical phase lock between PHP1A/PHP2A and PHP1B/PHP2B is achieved.

First, it will be observed that the output of the VCO 54A, 54B is not looped back directly to one of the inputs to the phase detector 52A, 52B, but rather is doubled in frequency through the frequency doubler 31A, 31B before being applied to the CGD 19A, 19B in which PHP1A/PHP2A and PHP1B/PHP2B are generated for use in controlling the logic circuitry in the 8 CPUs, MUs, SCUs, IOUs of the two respective systems. Then, it is the PHP1A and PHP2A which are applied to the two inputs to AND-gate 51A in system A 1 and to the two inputs to AND-gate SOB in system B 2.

Similarly, PHP1B and PHP2B are applied to the two inputs to AND-gate 51B in system B and to the two inputs to AND-gate 50A in system A.

Reference may be taken briefly again to FIG. 3 in which the logical combination PHP1A+PBP2A is shown. This signal, representative of the outputs of the AND-gates 51A, 50B, serves as one input each to phase detectors 52A and 52B, respectively. Similarly, a signal PHP1B+PHP2B, representative of the outputs of the AND-gates 51B, 50A, serves as a second input each to phase detectors 52B and 52A, respectively. Referring back to FIG. 5, the output of AND-gate 51A may be deemed the local loop feedback signal for phase detector 52A whereas the output of AND-gate 51B may be deemed the local loop feedback signal for phase detector 52B. Conversely, the output of AND-gate 50A may be deemed the reference frequency signal for phase detector 52A whereas the output of AND-gate 50B may be deemed the reference frequency signal for phase detector 52B.

Consider first the operation of the oscillator/phase locked loop circuit in CMU 18A with the master/slave switch 55A in the "master" position as shown in FIG. 5. It will be seen that the phase detector 52A and amplifier 53A have no effect on the frequency of oscillation of the VCO 54A which, instead, receives its frequency governing control voltage input from a fixed source merely exemplified by $V_{CC}/2$ (i.e., the voltage from the conventional power supply—not shown—for the logic circuitry divided by two). The frequency of PHP1A will therefore be twice the VCO 54A frequency which is first doubled in the voltage doubler 31A before being used in the CGD 19A to develop PHP1A and PHP2A as previously described above in the discussion in conjunction relating to the circuitry of FIG. 2.

However, the operation of the oscillator/phase locked loop circuit in CMU 18B with the master/slave switch 55A in the "slave" position as shown in FIG. 5 will be different. The signal PHP1A+PHP2A will be effectively supplied at the output of AND-gate 50B as the reference signal to phase detector 52B. The instantaneous frequency of VCO 54B is represented by the signal PHP1B+PHP2B at the output of AND-gate 51B, as previously described, and is thus used as the local oscillator signal looped back to the phase detector 52B. The output voltage from the phase detector 52B applied to the control input of VCO 53B will reflect the phase difference, if any, between PHP1A+PHP2A and PHP1B and PHP2B. Consequently, if necessary, the frequency of the VCO 54B will be pulled appropriately to bring the oscillator/phase locked loop circuit in CMU 18B into phase lock which is the sought after condition in which PHP1A and PHP1B (and, consequently, PHP2A and PHP2B) are in phase, thus facilitating information exchange between the two systems 1, 2 through the switch bank 3 (FIG. 1).

If there is a failure in system A 1, system B 2 can run independently by setting the switch 55B to the "master" position in which the frequency at which VCO 54B oscillates is independent of the phase detector 52B. If there is a need, such as during startup, to run the systems independently, both switches 55A, 55B can be set to the "master" position. If it is desired to make system B 2 the master, switch 55B can be set to the "master" position and switch 55A to the "slave" position in which the signal PHP1B+PHP2B becomes the reference applied to phase detector 52A by AND-gate 50A and the local feedback signal PHP1A+PHP2A is applied to the phase detector 52A by AND-gate 51A, any output from the phase detector 52A representing a phase difference being used to appropriately adjust the frequency of oscillation of VCO 54A to obtain phase lock in which PHP2A and PHP2B (and, consequently, PHP1A and PHP1B) are in phase. In practice, the switches 55A, 5SB are electronic circuits which should incorporate logic to lock out a condition in which both switches are set to the "slave" position since instability could result from establishing this invalid condition.

Figure 6:
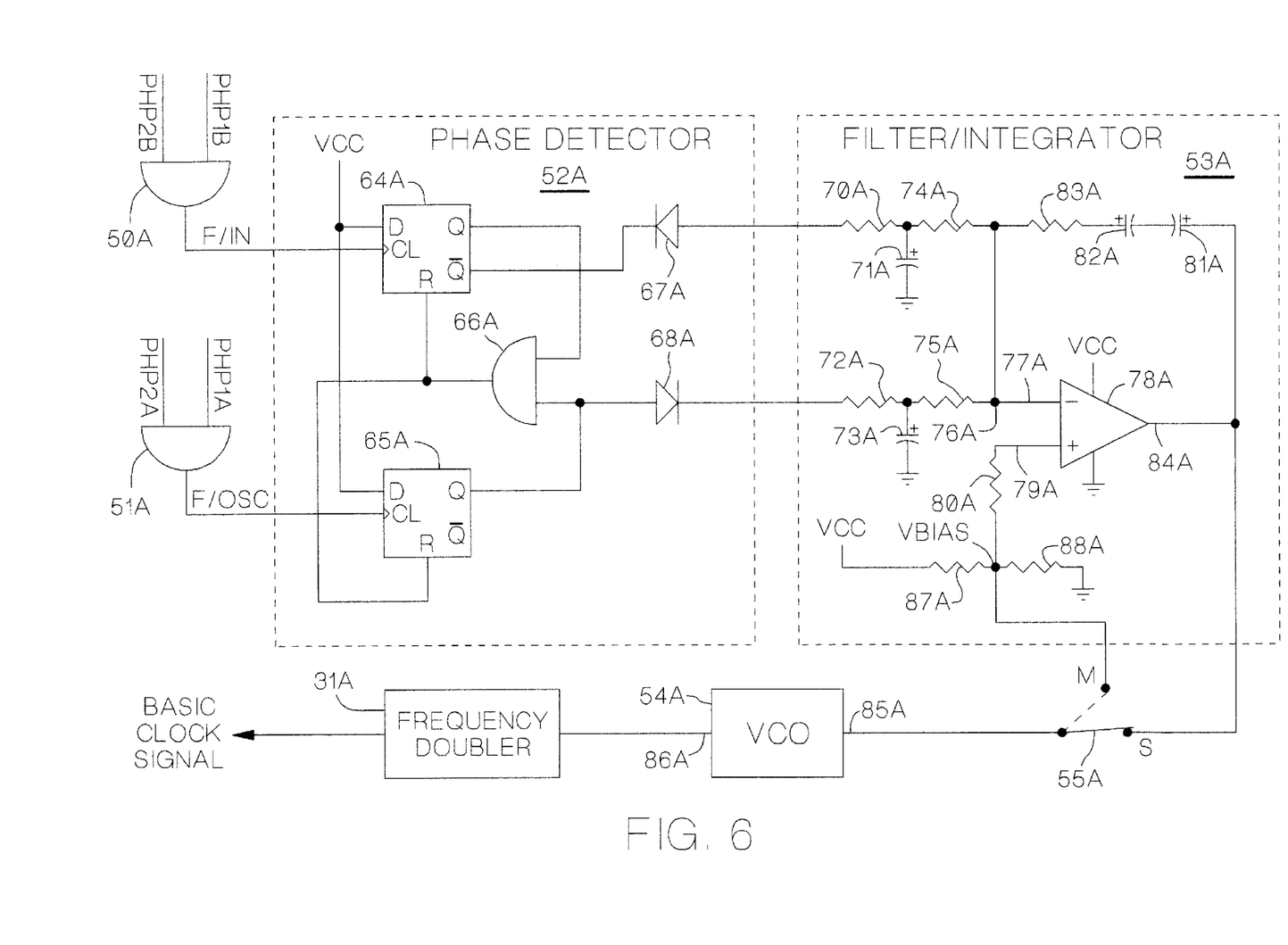
FIG. 6 is a schematic diagram of a dual flip-flop phase detector phase locked loop illustrating modifications by which this type of phase locked loop may be incorporated into the present invention.

The well known, commercially available type of phase locked loop which employs a dual flip-flop phase detector has been found to be readily adaptable for incorporation into the present invention, and such a modified phase locked loop is shown in FIG. 6. In accordance with all phase locked loops, the principal circuit blocks are a phase detector 52A, a voltage controlled oscillator 54A and a filter/integrator 53A. The phase detector 52A receives both an external reference frequency signal F/IN (PHP1B+PHP2B from AND-gate 50A in the example of FIG. 6) and an internal signal F/OSC (PHP1A+PHP2A from AND-gate 51A in the example) fed back from the VCO 54A, the phase locked loop serving to force F/OSC, which may be used to control other circuitry (not shown in FIG. 6, but, for example, CGD 19A in FIG. 5), into frequency and phase lock with the reference signal F/IN. The instantaneous frequency of the VCO 54A output is governed by a voltage signal derived in the filter/integrator 53A from information received from the phase detector 52A, all as well known in the art.

In the exemplary dual flip-flop type of phase detector shown in FIG. 6, a first D-type flip-flop 64A, a second D-type flip-flop 65A and an AND-gate 8 66A are interconnected to obtain the signals sent to the filter/integrator 53A. The data inputs of each of the flip-flops 64A, 65A are connected directly to $V_{CC}$ such that each positive going transition at each clock input sets the corresponding flip-flop to obtain a logic "1" signal at its Q output and a logic "0" signal at its Q-bar output. An AND-gate 66A is driven from the Q outputs of the two flip-flops 64A, 65A and will thus be fully enabled and issue a "clear" signal when both flip-flops are set. AND-gate 66A drives reset inputs, which are sensitive to the positive going transition of the "clear" signal, to each of the flip-flops 64A, 65A.

A first diode 67A is connected to the Q-bar output of flip-flop 64A in a polarity that can pass current only when the Q-bar output is at the logic "0" level; i.e., when the flip-flop 64A is set. A second diode 68A is connected to the Q output of flip-flop 65A in a polarity that can pass current only when the Q output is at the logic "1" level; i.e., also when the flip-flop 65A is set In operation, the phase detector senses any phase difference between F/IN and F/OSC by taking advantage of the fact that, although the flip-flops 64A, 65A are reset at the same time by the output of the AND-gate 66A, they are subject to being set independently by F/IN and F/OSC. Thus, under conditions in which there is not yet phase lock, one or the other of the flip-flops 64A, 65A will be set for a longer period. (In fact, as will be discussed further below, one of the flip-flops will "ideally" be set for a period of "zero" length.) Consequently, current will pass through the corresponding diode 67A, 8 for a longer period than through the other. By way of example, if F/OSC is slightly ahead of F/IN, the flip-flop 65A will be set before the flip-flop 64A, and current will flow through diode 68A for a longer period than it does through diode 67A. (As previously noted, ideally, there would be no current flow at all through the diode 67A in this example.)

The downstream filter/integrator 53A is sensitive to these potential differences in current flow periods through the diodes 67A, 68A. The anode of diode 67A is connected to one end of a resistor 70A which has its other end connected to one plate of a capacitor 71A which, in turn, has its other plate connected to ground. Conversely, the cathode of diode 68A is connected to one end of a resistor 72A which has its other end connected to one plate of a capacitor 73A which has its other plate connected to ground. It will be seen that the resistor 70A/capacitor 71A combination effects a low pass filter which serves to store a voltage intermediate logic "1" and logic "0" representing the recent average current passing through the diode 67A. Similarly, the resistor 72A/capacitor 73A combination effects a low pass filter which serves to store a voltage intermediate logic "1" and logic "0" representing the recent average current passing through the diode 68A.

The voltages stored across each of the capacitors 71A, 73A are coupled, through respective summing resistors 74A, 75A, to a summing or averaging point 76A which is connected to the negative input 77A of a differential control amplifier 78A. The positive input 79A to the differential amplifier 78A is coupled, through isolation resistor 80A, to a constant positive voltage reference, $V_{BIAS}$, established at the junction of matched resistors 87A, 88A which are connected between $V_{CC}$ and ground potential. In this example, $V_{BIAS}$ is therefore set to the midpoint between $V_{CC}$ and ground potential. Optionally, a unity gain differential amplifier (not shown) may be conventionally interposed between the junction of the resistors 87A, 88A and the resistor 80A to remove any substantive load from the reference voltage source and thus permit a wider choice for obtaining the reference voltage.

A feedback loop including series connected, back-to-back oriented capacitors 81A, 82A (thus effecting a smaller, non-polarized capacitor) and resistor 83A is provided between the output 84A of the differential amplifier 78A and the summing point 76A. The output 84A of the differential amplifier 78A is also connected to the control input 85A to the VCO 54A. It will therefore be understood that the instantaneous frequency of the output 86A from the VCO 54A is directly dependent on the instantaneous voltage at its input 85A. As previously mentioned and as better shown in FIG. 5, the output from the VCO 54A drives frequency doubler 31. The output from frequency doubler 31 is used, as also previously described, as the basic clock signal from which PHP1A and PHP2A are developed.

Consider first a steady state condition in which F/IN and F/OSC are the same frequency and in phase; i.e., phase lock has already been achieved. Assuming identical circuit responses and uniform delay through the various components, flip-flops 64A, 65A will be set simultaneously and, a very short time later (due to delay in the flip-flop circuitry), AND-gate 66A will be fully enabled. After another brief delay due to the AND-gate circuitry, the output of AND-gate 66A will apply a reset signal to each of the flip-flops 64A, 65A. After yet another brief delay due to the flip-flop reset circuitry, flip-flops 64A, 65A will simultaneously reset. Consequently, equal, but opposite logic levels, very short "bursts" of voltage will be applied to the cathode and anode, respectively, of diodes 67A, 68A. Restated, these "pump down" (logic "0") and "pump up" (logic "1") signals are substantially identical in pulse width and therefore replenish the charges on capacitors 71A, 73A, respectively, equally; i.e. to the respective voltage levels reached during the preceding cycle of operation. Thus, the voltage stored across the capacitor 71A is nearer to logic "0" whereas the voltage stored across the capacitor 73A is nearer to logic "1".

Therefore, the voltage appearing at summing point 76A remains the same (a value exactly midway between, or the average of, the respective positive voltages stored across capacitors 71A, 73A) such that the output voltage from the differential amplifier 78A will remain at the value which will maintain the VCO 54A at the same instantaneous frequency. (This analysis assumes no leakage, deliberate or unintended, across the capacitors 71A, 73A and that the input impedances to the differential amplifier 78A are high. If, in fact, there is a small amount of leakage around one or the other or both capacitors 71A, 73A and taking into account the small drain through the input 77A of the differential amplifier 78A, just enough additional, compensating current will flow through one or both the diodes 67A, 68A to make up the loss each cycle.)

As soon as the very brief, simultaneous "pump down" and "pump up" signals are removed, the capacitors 71A, 73A will be free to try to slowly "balance" (assume the same voltage) such that there will be a small amount of current flow through the summing resistors 74A, 75A from the capacitor 73A to the capacitor 71A as well as a small amount into the negative input 77A of the differential amplifier 78A. However, the voltage at the summing point 76A will remain the same, and the charges on the capacitors 71A, 73A will be replenished by the next successive pumping period. As a practical matter, the resistances of summing resistors 74A, 75A are much larger than resistors 70A, 72A such that the voltages appearing across the capacitors 71A, 73A only very slightly tend to change toward the summing point value from cycle to cycle under phase lock conditions, and any change is made up each cycle. Thus, this effect is usually ignored in an analysis of the operation of a dual flip-flop phase detector type of phase locked loop.

Now, consider a subsequent condition in which one of the frequency inputs changes phase, for example, when a frequency shift (intended or unintended) is taking place. Assume, merely by way of example, that the frequency of F/IN has slightly increased. As a result, the flip-flop 64A will be set slightly in advance of the flip-flop 65A, and they will both be reset simultaneously as previously described. Therefore, for the present cycle of operation, the "burst" of logic "0" voltage applied through diode 67A will last longer than the "burst" of logic "1" voltage applied through the diode 68A. The capacitor 71A will thus have a chance to discharge ("pump down") to a lower positive voltage than during the previous cycle while the capacitor 73A will "pump up" to substantially the same positive voltage. The result is that the voltage appearing at the summing point 76A will move slightly lower from its previous value. This will cause the voltage appearing at the output 84A of the differential amplifier 78A and the input 85A of the VCO 54A to change in the direction which will cause the VCO 54A to increase the frequency of its output 86A. Over a period of some number of cycles, the frequency/phase of the output 86A from the VCO 54A, as represented by PHP1A+PHP2A (F/OSC), will "catch up" and lock to the new frequency/phase of F/IN. Thereafter, until another change occurs in the frequency/phase of F/IN or F/OSC, the brief, simultaneous "pump down" and "pump up" currents will be equal to maintain the new average voltage values established across the capacitors 71A, 73A, and, correspondingly, the new, lower positive, voltage at the summing point 76A, thus maintaining phase lock between the F/IN and FIOSC at the new, higher, frequency.

It is usually not desirable to try to fully "correct" the output frequency of the VCO 54A immediately because instability may result. The feedback loop comprising the capacitors 81A, 82a and resistor 83A between the output 84A of the differential amplifier 78A and the summing point 76A serves to "soften" the effect of the changes in respective voltage levels across the capacitors 71A, 73A to limit the rate of change to a safe level. That is, the feedback loop is phased to add a component to the voltage appearing at the summing point 76A which partially counteracts any change resulting from the summation of the voltages across the capacitors 71A, 73A due to a sensed phase error. As a result, relock safely takes place over some number of cycles.

Those skilled in the phase locked loop art will understand that the foregoing is not quite the "ideal" usually employed in explaining the operation of the dual flip-flop phase detector form of the classical phase locked loop. In the ideal phase locked case in which circuit delay is ignored, the diodes 67A, 68A are assumed to be perfect, the capacitors 71A, 73A are assumed to have no leakage whatever, the summing resistors 74A, 75A are assumed to be perfectly matched and the inputs 77A, 79A to the differential amplifier 78A are assumed to have infinite impedance, there will be no (i.e., infinitely narrow) "pump up" and "pump down" pulses (the AND-gate 66A being "instantaneously" enabled and the flip-flops 64A, 65A being "instantaneously" reset), and capacitor 73A will slowly discharge through summing resistors 74A, 75A to capacitor 71A (as well as into the negative input 77A of the differential amplifier 78A), thus maintaining the established voltage at the summing point 76A and thus the control voltage to the VCO 54A which results in phase lock. Theoretically, this current flow between the capacitors 71A, 73A will continue until the capacitors eventually each store the voltage seen at the summing point 76A. As a practical matter, even considering the brief, simultaneous "pump up" and "pump down" pulses which actually appear during phase lock as well as the existence of a brief pump pulse opposite to the substantive appropriate correcting pump pulse when out of lock, the circuit works substantially as described above and in a very satisfactory manner for relatively low frequency operation.

However, a subtle problem, which is always present, becomes substantive when the frequency of operation (as governed by F/IN) is raised beyond a certain level which is a factor of just how much delay takes place in the flip-flops 64A, 65A and the AND-gate 66A during nominally normal operation under the condition in which phase lock has apparently been achieved. This delay, which gives rise to the subtle problem, is variable according to the family of integrated circuit implemented and variations in the manufacturing process, etc., of even apparently identical integrated circuit chips. The delay may also change slightly as a result of temperature changes, $V_{CC}$ changes, etc., experienced by the integrated circuit in use. Generally, it may be stated that the problem becomes significant when the frequency of F/IN is sufficiently high that the circuit delay through the flip-flops and reset gate (flip-flops 64A, 65A and AND-gate 66A in the example) result in a significant period for the extraneous simultaneous "pump up" and "pump down" pulses being issued from the phase detector 52A when the phase locked loop is in apparent phase lock.

Because these extraneous simultaneous "pump up" and "pump down" pulses should theoretically have exactly equal amplitudes and time periods, it might be thought that they would merely cancel one another out. But, this presumes that the summing point (the summing point 76A in the example) in the circuit driven by the phase detector 52A has a threshold that is exactly half way between the two pulses as established at the reference input 79A to the differential amplifier 78A. In a practical circuit, that is not the case, and it is this fact, together with the unavoidable existence of the extraneous simultaneous "pump up" and "pump down" pulses, which introduces a phase error at apparent phase lock which can become unacceptably large for critical applications at higher frequencies; i.e., as stated above, at frequencies which result in a significant period for the extraneous simultaneous "pump up" and "pump down" pulses being issued from the phase detector 52A as a consequence of the unavoidable, fixed delay through the phase detector circuitry.

To the extent reasonably possible, diodes 67A, 68A; resistors 70A, 72A; capacitors 71A, 73A; and summing resistors 74A, 75A are closely matched in order to minimize any phase offset between the two inputs to the phase detector 52A at apparent phase lock due to mismatch of these components. As a practical matter, it is possible to achieve a sufficiently close match of these components, by selection and/or trimming as well known in the art, that any residual imbalance of the voltage observed at the summing point 76A due to mismatch of these components may be ignored, even for critical applications.

However, several variables in the phase detector circuitry may contribute, each alone or in combination with one or more other variables, to bring about the phase lock offset problem to which the present invention is directed. Still referring to FIG. 6, the set circuit delays in the flip-flops 64A, 65A may be slightly different. Similarly, the reset circuit delays through the two flip-flops may be slightly different. The differences between the logic "1" and logic "0" voltage levels appearing at the Q and Q-bar outputs of the flip-flops 64A, 65A may be slightly different and may vary differently from $V_{CC}$ and circuit ground. The circuitry of the AND-gate 66A may be faster between one input and the output than the other input. The forward threshold voltages across the diodes 67A, 68A and/or reverse resistances may be slightly different, etc.

As a first simple example of the effects of these possible differences, assume that, while all other differences between variables are minimal, the delay through the set circuitry of the flip-flop 64A is slightly greater than that through the set circuitry of the flip-flop 65A. Assume further an instantaneous condition in which F/N and F/OSC are perfectly in phase such that the flip-flops 64A, 65A should set simultaneously, but, in fact, the flip-flop 64A sets slightly behind the flip-flop 65A because of the assumed slight mismatch.

Under these conditions, the extraneous simultaneous "pump up" and "pump down" pulses issued from the phase detector 52A will have slightly different widths/periods. More particularly, the width of the pulse applied by the flip-flop 65A to "pump up" the capacitor 73A will transfer slightly more energy to the capacitor 73A than the flip-flop 64A removes from the capacitor 71A because, while the flip-flops 64A, 65A are reset simultaneously, the flip-flop 65A sets first. Consequently, the voltage across the capacitor 73A will move slightly more positive and the voltage at the summing point 76A will also become more positive. This results in a change of the output voltage from the differential amplifier 78A which tends to slightly lower the output frequency from the VCO 54A. Thus, during the next cycle of operation, F/OSC will slightly lag F/N such that the clock signal to set the flip-flop 64A arrives slightly in advance of the clock signal to set the flip-flop 65A. After a few cycles of operation, a stable point will be reached at which the signals F/N and F/OSC are identical in frequency and the pulse widths of the extraneous simultaneous "pump up" and "pump down" pulses are identical, but F/OSC trails FIN in phase to compensate for the imbalance resulting from the differences in the set circuit delays between the flip-flops 64A, 65A. Other examples, assuming imbalance in one or more of the other variables previously noted between the two sides of the phase detector circuitry, demonstrate similar results.

Experience and analysis has demonstrated that the exemplary source of imbalance discussed immediately above, i.e., delay differences through the set inputs to the two flip-flops 64A, 65A (or other circuit delay differences), is not as important a factor as might at first be thought because if, for example as above, one of the flip-flops is slower to set, it will typically also be slower, by about the same amount, to reset such that little actual difference in the pulse widths of the extraneous simultaneous "pump down" and "pump up" pulses at instantaneous phase lock is observed. The same observation applies to the other variables which theoretically might result in different pulse widths for the simultaneous "pump up" and "pump down" pulses issued by the phase detector at apparent phase lock.

However, the same cannot be said for the voltage differences which might exist between logic "1" and logic "0" voltage levels at the Q and Q-bar outputs of the two flip-flops 64A, 65A compared to $V_{CC}$ and ground. That is, if the midpoint between logic "1" and logic "0" voltages at the Q-bar output of the flip-flop 64A and the Q output of the flip-flop 65A, respectively, is found to be sufficiently different from the midpoint between $V_{CC}$ and ground, then there is no compensating effect, and the error cannot be ignored if the phase locked loop is operating at frequencies at which the circuit delays in the flip-flops 64A, 65A and the AND-gate 66A result in extraneous simultaneous "pump up" and "pump down" pulses of substantial width (i.e., a substantial portion of the duty cycle) during instantaneous phase lock. A substantive error results even if these pulses are nominally the same width.

For example, if the midpoint between logic "0" at the Q output of the flip-flop 65A and logic "1" at the Q-bar output of the flip-flop 64A is more positive than that between $V_{CC}$ and ground, then, for equal width extraneous simultaneous "pump up" and "pump down" pulses issued under actual phase lock conditions, the voltage appearing at the summing point 76A will become slightly more positive than the correct voltage for maintaining phase lock as established by the reference voltage, $V_{BIAS}$, applied to the positive input 79A of the differential amplifier 78A. As a result, the voltage appearing at the output 84A of the differential amplifier will be such as to momentarily slightly decrease the frequency of the VCO 54A to retard the next set condition of the flip-flop 65A behind that of the flip-flop 64A. Under these conditions, a stable condition will quickly be reached in which F/N and F/OSC are identical in frequency, but F/OSC lags F/N in phase. The stable voltage then present at the summing point 76A is an incorrect indication that true phase lock has been achieved.

It has been found that it cannot be assumed that the inherent phase error described above can be ignored in the present application which is deemed to be critical and expected to operate in a frequency range in which the extraneous "pump up" and "pump down" pulses are present for a significant portion of the duty cycle. Therefore, this problem must be addressed and resolved if the dual flip-flop phase detector type of phase locked loop is chosen for use.

Figure 7:
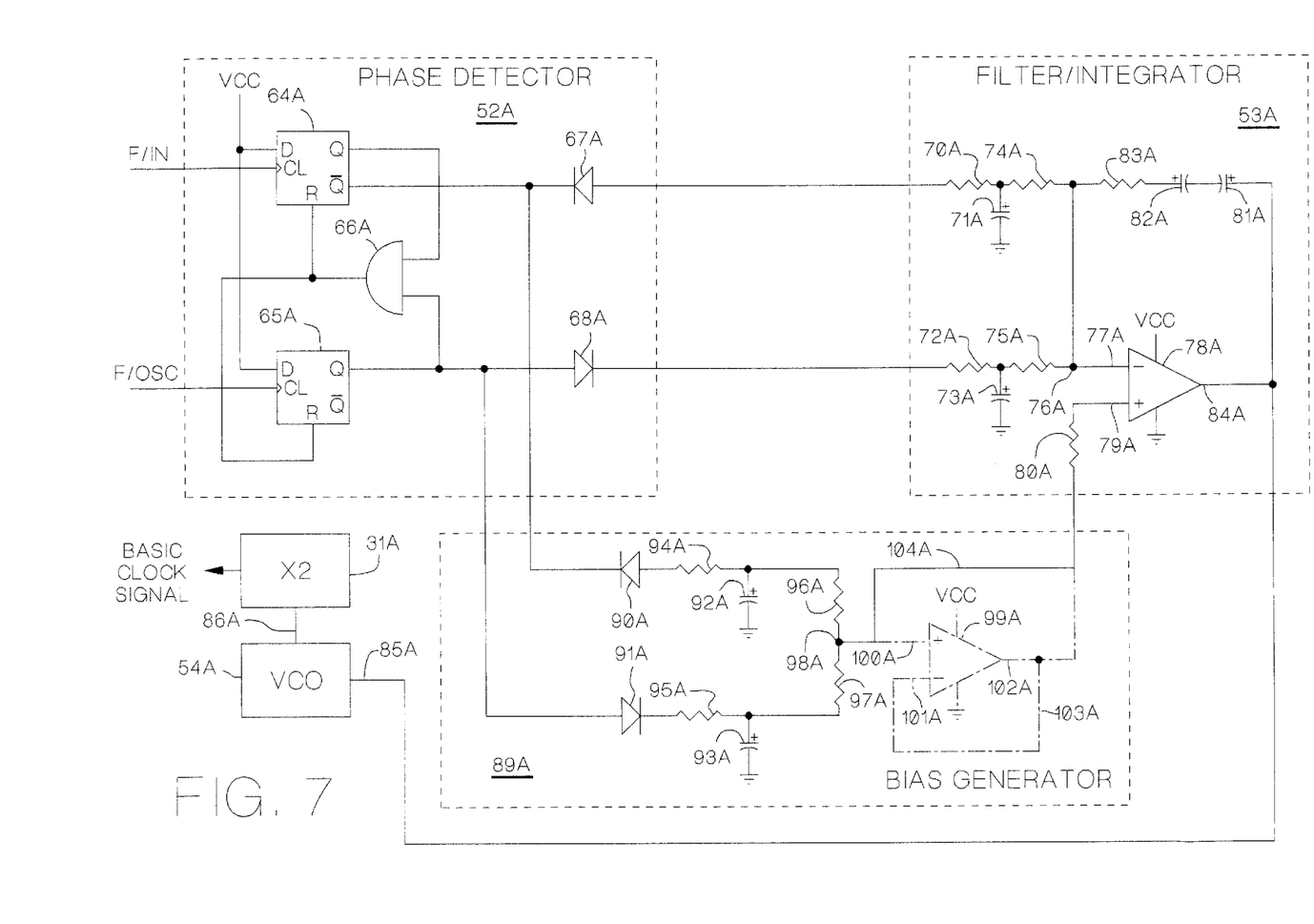
FIG. 7 is a schematic diagram of a dual flip-flop phase detector phase locked loop illustrating further modifications by which more accurate phase lock may be obtained for critical applications such as that contemplated in the practice of the present invention.

Thus, attention is now directed to FIG. 7 in which there is presented an exemplary embodiment of a compensating circuit which overcomes this subtle source of error. In this revised phase locked loop, the positive bias voltage appearing at the reference input 79A to the differential amplifier 78A originates is in a bias generator 89A at a summing point 98A disposed at the junction between summing resistors 96A, 97A. The other end of summing resistor 96A is connected to one terminal of a capacitor 92A which has its other terminal connected to ground potential. A resistor 94A is connected between the capacitor 92A/resistor 96A junction and the anode electrode of a diode 90A which has its cathode electrode connected to the cathode electrode of diode 67A and the Q-bar output of flip-flop 64A. Similarly, the other end of summing resistor 97A is connected to one terminal of a capacitor 93A which has its other terminal connected to ground potential. A resistor 95A is connected between the capacitor 93A/resistor 97A junction and the cathode electrode of a diode 91A which has its anode electrode connected to the anode electrode of diode 68A and the Q output of flip-flop 65A.

The diodes 90A, 91A are closely matched to one another and to the diodes 67A, 68A as by selection and/or by the use of diodes all resident on the same integrated circuit (which tend to be inherently well matched). The capacitors 92A, 93A, the resistors 94A, 95A and the resistors 96A, 97A are also respectively carefully matched. In addition, the values of the capacitors 92A, 93A and resistors 34, 35 are selected to establish a long time constant with respect to the expected range of frequency operation. Therefore, under a condition of apparent phase lock, the capacitor 93A will charge, through the diode 91A and resistor 95A, toward (and reach after some number of cycles according to the time constant selected) the peak voltage of the logic "1" "pump up" pulse which appears briefly each cycle of F/OSC at the Q output of the flip flop 65A. Similarly, the capacitor 92A will discharge, through the diode 90A and the resistor 94A to the lowest value (near ground potential) of the logic "0" "pump down" pulse appearing at the Q-bar output of the flip-flop 64A. Consequently, the voltage appearing at the summing point 98A, after a few cycles of operation at apparent phase lock, is exactly at the midpoint between the logic "1" level issued as the "pump up" pulse from the Q output of flip-flop 65A and the logic "0" level issued as the "pump down" pulse from the Q-bar output of flip-flop 64A. Consequently, if there is an offset from the ideal voltage which should appear at the summing point 16 due to the slight differences in "pump up" and "pump down" currents during the equal width "pump up" and "pump down" pulses, then the same voltage offset appears at the summing point 98A of the bias generator 89A. This offset voltage is, in turn, applied to the positive input 79A, via line 104A and through isolation resistor 80A, to exactly counteract the offset voltage appearing at the summing point 76A.

That is, if, for example, the voltage at the summing point 76A, under conditions of true phase lock, is slightly more positive than it should be, the voltage appearing at the positive input 79A to the differential amplifier 78A will also be slightly more positive by the same amount, thus compensating for the error. Since there is no differential error across the inputs 77A, 79A to the differential amplifier 78A, the voltage appearing at the output 84A of the differential amplifier will be that which is correct to maintain the frequency of the VCO 54A when actual phase lock between F/IN and F/OSC is reached. As a result, true phase lock may be obtained and maintained.

FIG. 7 also illustrates a variant embodiment of the bias generator 89A in which the line 104A is omitted and a differential isolation amplifier 99A is interposed between the summing point 98A and the positive input 79A to the differential amplifier 78A. The differential amplifier 99A is connected for unity gain between its output 102A and its negative input 101A by feedback loop 103A. Thus, the voltage appearing at the summing point 98A, applied to the positive input 100A of the differential amplifier 99A is also present at the differential amplifier output 102A. The purpose of the differential amplifier 99A in this embodiment of the invention is to isolate the summing point 98A from any substantive current drain through the positive input 79A of the differential amplifier 78A since there is very little supply current to the capacitors 92A, 93A. However, inasmuch as the input impedance to the positive input 79A of the differential amplifier 78A is high, the differential amplifier 99A is not necessary for most applications.

As previously mentioned, the time constants of the RC circuits constituting, respectively, the capacitor 92A and resistor 94A and the capacitor 93A and resistor 95A are selected to be relatively long at the frequency range of operation contemplated. This serves to permit relocking whenever phase lock is lost as a result of a frequency change in one or another of F/IN and F/OSC. Typically, it is a change in the reference frequency F/IN (from the "master" system) which brings about such loss of phase lock. Thus, for example, when F/IN increases and flip-flop 64A is set ahead of flip-flop 65A to cause a fully valid "pump down" pulse (extended by the delays previously discussed) to be generated for a substantially longer period than the transient "pump up" pulse, the voltage appearing at the summing point 76A moves less positive at a much faster rate than the voltage appearing at the summing point 98A of the bias generator, thus permitting the normal response of the differential amplifier 78A in tracking the voltage change at the summing point 76A and issuing a change of voltage at its output 84A which causes the frequency of the VCO 54A to correspondingly adjust.

The compensating bias generator 89A shown in FIG. 7 is only exemplary of several contemplated static and dynamic compensation circuits which can be employed to eliminate or greatly minimize the phase offset error at apparent phase lock inherent to the dual flip-flop phase detector type of phase locked loop. For a further discussion of such compensation circuits, one may refer to copending applications filed on even date herewith and assigned to the same assignee hereas: DUAL FLIP-FLOP DETECTOR TYPE PHASE LOCKED LOOP INCORPORATING DYNAMIC PHASE OFFSET CORRECTION by Donald R. Kesner, Ser. No. 08/625,670 and DUAL FLIP-FLOP DETECTOR TYPE PHASE LOCKED LOOP INCORPORATING STATIC PHASE OFFSET CORRECTION by Donald R. Kesner, Ser. No. 08/625,663 both incorporated by reference herein.

In the foregoing description, certain simplifications have been made to more clearly set forth the invention. For example, positive logic has been assumed throughout. Those skilled in the art will be able to readily adapt the principles of the invention to any application using any given logic family by following the teachings of the present specification taken with the accompanying drawing. Further, while only a dual redundant system has been specifically disclosed, the invention is readily adaptable to three or more interconnected systems. In such case, a single one of the systems is designated as the "master" and all others run in the "slave" mode shown in FIGS. 6 and 7. That is, F/IN, in all the slave systems, originates from the PHP1 and PHP2 signals generated in the master system.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A redundant computer system comprising:
   A) first and second computer systems, each said first and second computer system including:
      1) at least one central processing unit;
      2) a clock unit including:
         a) a clock generating and distribution unit including an oscillator/phase locked loop circuit for generating a basic clock signal;
         b) logic clock and definer signal generating means driven by said basic clock signal, said logic clock and definer signal generating means being adapted to generate a logic clock signal at a frequency determined by said basic clock signal and a definer signal having a frequency which is half said logic clock signal frequency, said clock generating and distribution unit firer including time alignment means for delaying one of said clock and definer signals such that successive definer signal half cycles at logic "1" and logic "0" levels temporally bracket said logic clock signal fill cycles at a first logic level, selected from logic "1" and logic "0" levels, to define successive logic clock pulses at said first logic level as first and second phases thereof; and
         c) bus means for conveying said local clock and define signals to said central processor unit to coordinate the data manipulation operations therein;
   B) said oscillator/phase locked loop circuit means in each said clock unit further including:
      1) a voltage controlled oscillator having a control input, the amplitude of a d-c voltage applied to said control input determining the frequency of oscillation of said voltage controlled oscillator;
      2) a frequency multiplier driven by said voltage controlled oscillator and issuing said basic clock signal at a frequency which is a multiple of the frequency at which said voltage controlled oscillator is oscillating;
      3) a phase detector having first and second phase detector inputs, said phase detector being adapted to provide an output representative of the phase relationship between first and second input signals applied, respectively, to said first and second phase detector inputs, said phase detector comprising:
         a) first and second flip-flops capable of assuming first and second alternative binary states, each of said first and second flip-flops having a clock input, a reset input and at least one output issuing an output signal at one of logic "1" and logic "0" voltage levels depending upon a present state of said flip-flop, each of said first and second flip-flops;
            i) being connected to switch to said first state by a transition of a clock signal applied to said clock input thereof; and
            ii) having a reset input which is responsive to a transition of a clear signal to switch said flip-flop to said second state; and
         b) a clear signal generator responsive to the condition in which both said first and second flip-flops are simultaneously in said first state to issue said clear signal;

4) a filter/integrator comprising;
   a) a first capacitor having first and second terminals:
   b) a first diode coupled between said first terminal of said first capacitor and said output of said first flip-flop, said first diode being polarized to pass current only when said first flip-flop is in a predetermined one of said first and second states;
   c) a second capacitor having first and second terminals;
   d) a second diode coupled between said first terminal of said second capacitor and said output of said second flip-flop, said second diode being polarized to pass current only when said second flip-flop is in the alternative state to the state of said first flip-flop which allows said first diode to pass current;
   e) said second terminal of each of said first and second capacitors being connected to the same voltage reference level;
   f) a first summing resistor connected between said first terminal of said first capacitor and a summing point; and
   g) a second summing resistor connected between said first terminal of said second capacitor and said summing point;
5) an amplifier having a first input connected to said summing point and an output, the voltage level at said amplifier output being dependent on the voltage level applied to said first amplifier input;
6) a constant voltage source; and
7) master/slave selection means for selectively coupling one only of said constant voltage source and said amplifier output to said voltage controlled oscillator control input;
C) means coupling said logic clock and definer signals generated in said first computer system to said second computer system and means coupling said logic clock and definer signals generated in said second computer system to said first computer system;
D) means in said first computer system for logically combining said logic clock and definer signals generated in said first computer system and for applying the result to said first input of said phase detector in said first computer system;
E) means in said first computer system for logically combining said logic clock and definer signals generated in said second computer system and for applying the result to said second input of said phase detector in said first computer system;
F) means in said second computer system for logically combining said logic clock and definer signals generated in said second computer system and for applying the result to said first input of said phase detector in said second computer system; and
G) means in said second computer system for logically combining said logic clock and definer signals generated in said first computer system and for applying the result to said second input of said phase detector in said second computer system.

2. The redundant computer system of claim 1 in which said frequency multiplier is a frequency doubler and said basic clock signal and said logic clock signal are the same frequency.

3. The redundant computer system of claim 2 in which said amplifier is a differential amplifier and further includes a second input, which second input is coupled to a bias voltage source, the output of said differential amplifier being dependent on the difference between the voltages applied to said first and second differential amplifier inputs.

4. The redundant computer system of claim 2 which further includes, in each of said first and second computer systems, at least one memory unit, at least one system control unit and at least one input/output unit and in which said bus means further conveys said logic clock and definer signals generated therein thereto.

5. The redundant computer system of claim 3 which further includes, in each of said first and second computer systems, at least one memory unit, at least one system control unit and at least one input/output unit and in which said bus means further conveys said logic clock and definer signals generated therein thereto.

6. The redundant computer system of claim 3 in which said bias voltage source is a bias generator adapted to average a representation of the logic "1" voltage which causes a first one of said first and second diodes to conduct and the logic "0" which causes a second one of said first and second diodes to conduct to obtain an average voltage which is coupled to said second input to said differential amplifier.

7. The redundant computer system of claim 6 in which said average voltage is coupled to said second input to said differential amplifier via a gain-of-one buffer amplifier.

8. The redundant computer system of claim 1 in which said amplifier is a differential amplifier and further includes a second input, which second input is coupled to a bias voltage source, the output of said differential amplifier being dependent on the difference between the voltages applied to said first and second differential amplifier inputs.

9. The redundant computer system of claim 8 which further includes, in each of said first and second computer systems, at least one memory unit, at least one system control unit and at least one input/output unit and in which said bus means frothier conveys said logic clock and definer signals generated therein thereto.

10. The redundant computer system of claim 1 which further includes, in each of said first and second computer systems, at least one memory unit, at least one system control unit and at least one input/output unit and in which said bus means further conveys said logic clock and definer signals generated therein thereto.

11. The redundant computer system of claim 10 in which said bias voltage source is a bias generator adapted to average a representation of the logic "1" voltage which causes a first one of said first and second diodes to conduct and the logic "0" which causes a second one of said first and second diodes to conduct to obtain an average voltage which is coupled to said second input to said differential amplifier.

12. The redundant computer system of claim 11 in which said average voltage is coupled to said second input to said differential amplifier via a gain-of-one buffer amplifier.

\* \* \* \* \*